(12) United States Patent
Zhu et al.

(10) Patent No.: US 12,099,739 B2
(45) Date of Patent: Sep. 24, 2024

(54) TRACE DATA PROTECTION

(71) Applicant: International Business Machines Corporation, Armonk, NY (US)

(72) Inventors: Xi Bo Zhu, Beijing (CN); Xiao Xiao Pei, Beijing (CN); Shi Yu Wang, Beijing (CN); Qin Li, Shanghai (CN); Lu Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 16/940,442

(22) Filed: Jul. 28, 2020

(65) Prior Publication Data

US 2022/0035549 A1 Feb. 3, 2022

(51) Int. Cl.
*G06F 3/06* (2006.01)
*G06F 9/48* (2006.01)

(52) U.S. Cl.
CPC .......... *G06F 3/0647* (2013.01); *G06F 3/0619* (2013.01); *G06F 3/0673* (2013.01); *G06F 9/4843* (2013.01)

(58) Field of Classification Search
None
See application file for complete search history.

(56) References Cited

U.S. PATENT DOCUMENTS

| | | | | |
|---|---|---|---|---|
| 5,513,344 A * | 4/1996 | Nakamura | ............ | G11C 29/08 714/42 |
| 6,169,821 B1 * | 1/2001 | Fukunaga | .......... | H04N 21/4425 375/E7.172 |
| 6,445,621 B1 * | 9/2002 | Heightley | ............ | G11C 7/1048 365/189.11 |
| 7,000,072 B1 * | 2/2006 | Aisaka | ................... | G06F 12/126 711/E12.07 |
| 7,039,834 B1 * | 5/2006 | Orfali | ................. | G06F 11/2236 714/39 |
| 7,127,246 B1 * | 10/2006 | Muhonen | ................ | H04W 8/06 455/433 |
| 9,519,564 B1 | 12/2016 | Merrill | | |
| 2006/0031717 A1 * | 2/2006 | Blanchard | ........... | G06F 11/3636 714/37 |
| 2011/0113406 A1 * | 5/2011 | Flemming | ........... | G06F 11/3636 712/E9.032 |
| 2013/0151485 A1 * | 6/2013 | Kim | ..................... | G06F 11/3476 707/693 |

(Continued)

OTHER PUBLICATIONS

Mell et al., "The NIST Definition of Cloud Computing", Recommendations of the National Institute of Standards and Technology, Sep. 2011, 7 pages.

*Primary Examiner* — Kaushikkumar M Patel
(74) *Attorney, Agent, or Firm* — IBM Patents+ Team

(57) ABSTRACT

Embodiments of the present disclosure relate to a method, system and computer program product for trace data protection. In some embodiments, a method is disclosed. According to the method, a target task is determined from a plurality of tasks, where trace data of the target task is to be protected. The trace data of the target task is transferred from a first area to a second area of a memory. Existing trace data in the second area is offloaded to a storage device before being overwritten. In other embodiments, a system and a computer program product are disclosed.

17 Claims, 6 Drawing Sheets

(56) References Cited

U.S. PATENT DOCUMENTS

| | | | |
|---|---|---|---|
| 2013/0209072 A1* | 8/2013 | Dikvall | H04N 19/33 |
| | | | 386/328 |
| 2014/0006874 A1* | 1/2014 | Bohling | G06F 11/3471 |
| | | | 714/45 |
| 2014/0365833 A1* | 12/2014 | Bourne | G06F 11/3072 |
| | | | 714/45 |
| 2015/0220393 A1* | 8/2015 | Broderick | G06F 11/3648 |
| | | | 714/766 |
| 2016/0140020 A1* | 5/2016 | Cocks | G06F 11/3636 |
| | | | 714/38.1 |
| 2016/0217021 A1 | 7/2016 | Wang | |
| 2016/0371500 A1* | 12/2016 | Huang | G06F 21/604 |
| 2017/0083395 A1 | 3/2017 | Beard et al. | |
| 2017/0109258 A1* | 4/2017 | Martynov | G06F 11/3636 |
| 2018/0275898 A1* | 9/2018 | Bhansali | G06F 3/0608 |
| 2019/0095304 A1 | 3/2019 | Kumarasamy et al. | |
| 2021/0174857 A1* | 6/2021 | Yamazaki | H01L 27/1225 |
| 2021/0248124 A1* | 8/2021 | Tobin | G06F 16/1824 |

\* cited by examiner

TRACE DATA PROTECTION

BACKGROUND

The present disclosure relates to software programming, and more specifically, to a method, system, and computer program product for trace data protection.

Diagnostic data collection is useful for the serviceability of a computing system. Trace data is a type of diagnostic data, which can be used to understand behaviors of the computing system prior to occurrence of a problem. In some cases, trace data can be stored in a memory or an external storage device. However, these two options have their respective limitations.

SUMMARY

According to one embodiment of the present disclosure, there is provided a computer-implemented method. The method comprises determining a target task from a plurality of tasks, where trace data of the target task is to be protected. The method further comprises transferring the trace data of the target task from a first area to a second area of a memory. Existing trace data in the second area is offloaded to a storage device before being overwritten.

According to another embodiment of the present disclosure, there is provided a system. The system comprises a processing unit and a memory coupled to the processing unit. The memory stores instructions that, when executed by the processing unit, perform actions comprising: determining a target task from a plurality of tasks, where trace data of the target task is to be protected; and transferring the trace data of the target task from a first area to a second area of a memory, wherein existing trace data in the second area is offloaded to a storage device before being overwritten.

According to yet another embodiment of the present disclosure, there is provided a computer program product. The computer program product is tangibly stored on non-transient machine-readable medium and comprises machine-executable instructions. The machine-executable instructions, when executed on a device, cause the device to perform actions comprising: determining a target task from a plurality of tasks, wherein trace data of the target task is to be protected; and transferring the trace data of the target task from a first area to a second area of a memory, wherein existing trace data in the second area is offloaded to a storage device before being overwritten.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

Figure 1:
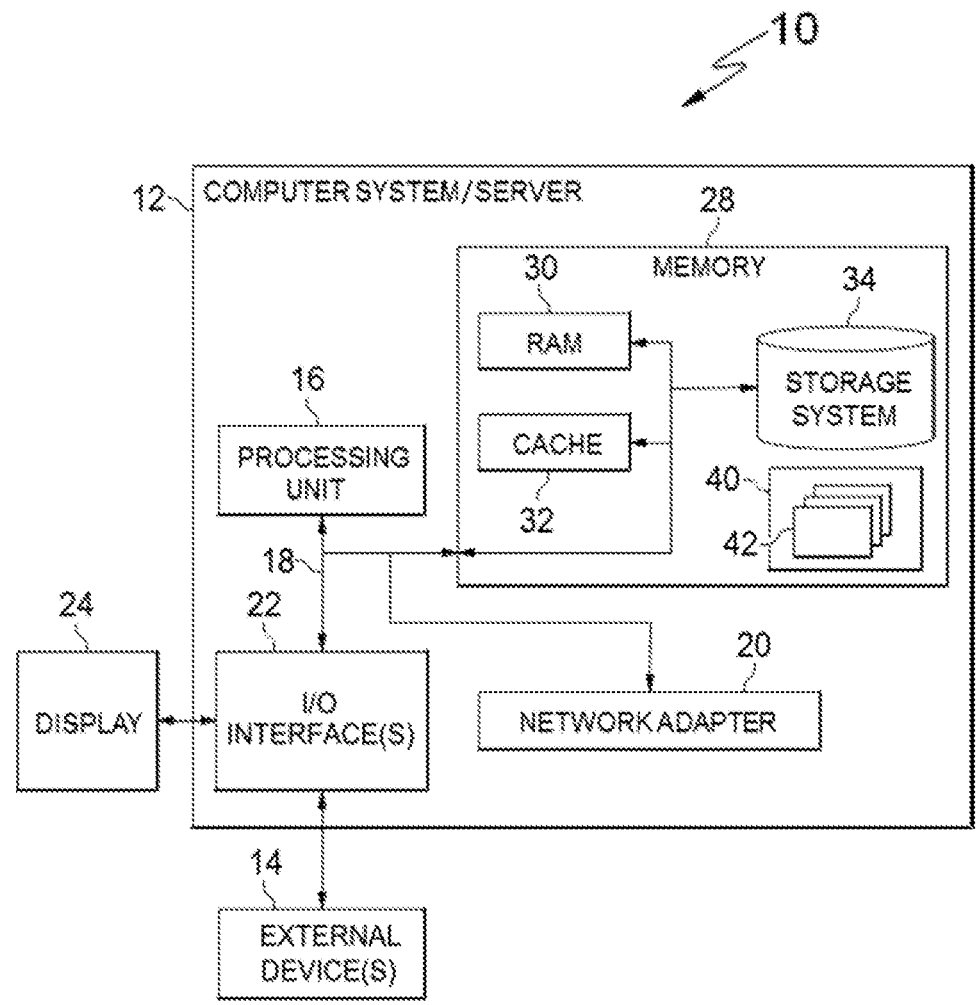
FIG. 1 is a block diagram of a cloud computing node, according to some embodiments of the present disclosure.

While the present disclosure is amenable to various modifications and alternative forms, specifics thereof have been shown by way of example, in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
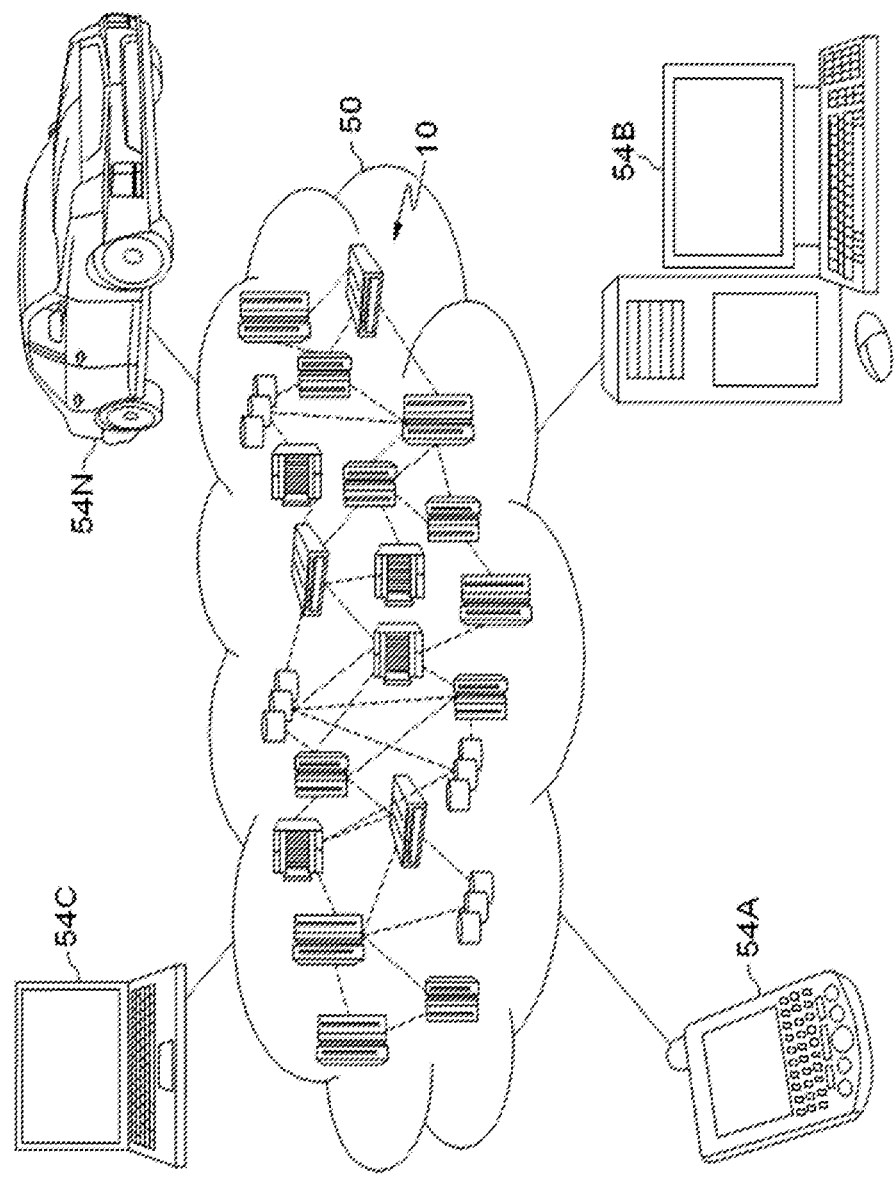
FIG. 2 is a block diagram of a cloud computing environment, according to some embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer MB, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
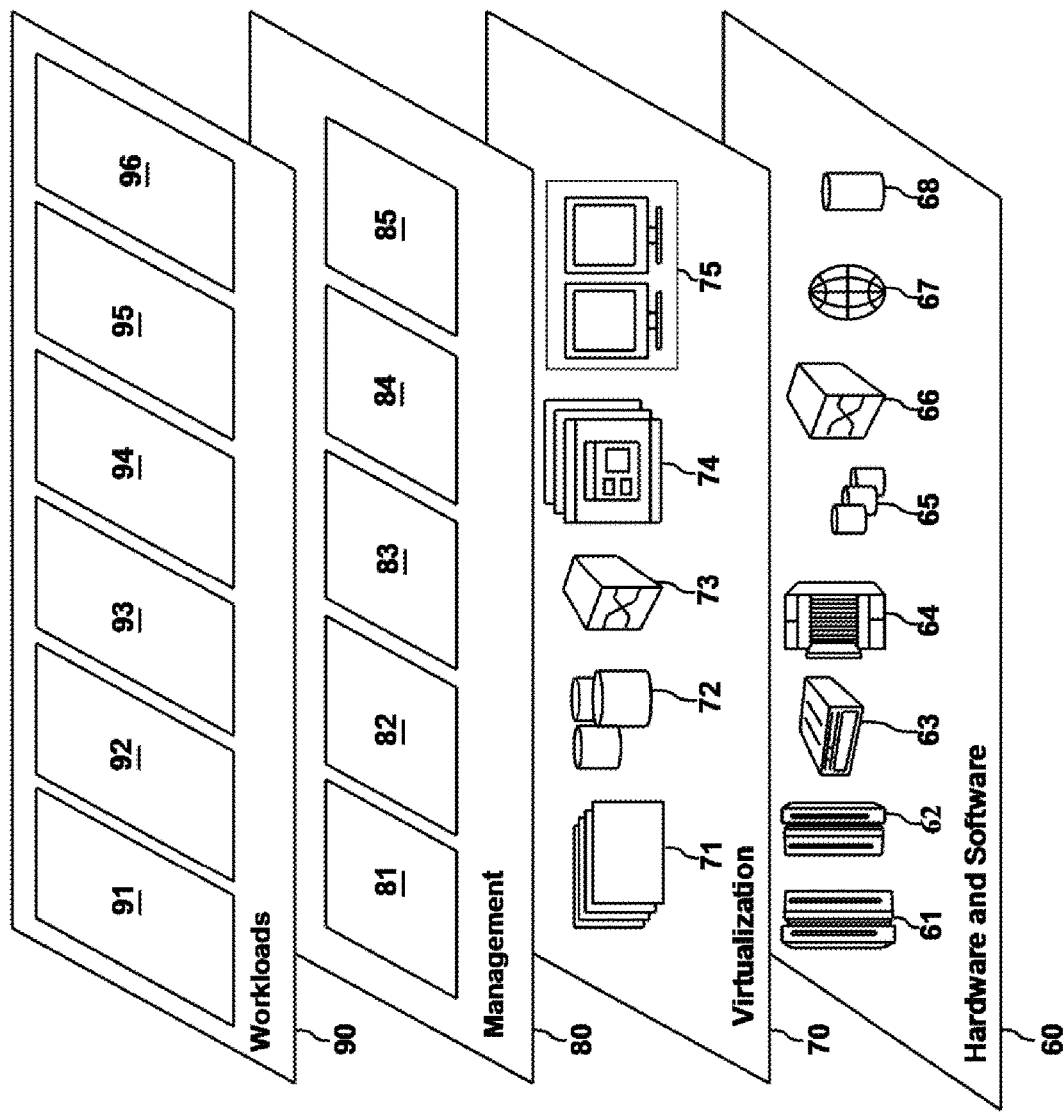
FIG. 3 is a block diagram of abstraction model layers, according to some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and trace data protection 96. Hereinafter, reference will be made to FIG. 4-6 to describe details of the trace data protection 96.

As described above, diagnostic data collection is useful for the serviceability of a computing system. Trace data is a type of diagnostic data, which can be used to understand behaviors of the computing system prior to occurrence of a problem. Traditionally, trace data can be stored in a memory or an external storage device. However, these two options have their respective limitations.

Trace data stored in the memory can usually be overwritten by new trace data generated subsequently. As such, when a problem occurs, the trace data related to the root cause of the problem may have been overwritten. If all of trace data is stored in the external storage device, the performance overhead for storing and accessing the trace data would be relatively high.

In order to at least partially solve the above and other potential problems, embodiments of the present disclosure can provide a solution for trace data protection. According to the solution, respective trace data of a plurality of tasks can be stored in a first area of a memory and trace data in the first area will be overwritten by new trace data generated by executing subsequent tasks. A target task of which trace data is to be protected can be determined from the plurality of tasks. The trace data of the target task can be transferred from the first area to a second area of the memory, where existing trace data in the second area is offloaded to a storage device before being overwritten. As such, this solution allows critical trace data in a memory to be protected properly and prevents the critical trace data from being overwritten by new trace data generated subsequently. Moreover, the protected trace data can be offloaded to an external storage device with minimal performance overhead. A system in which embodiments of the present disclosure can be implemented is shown with respect to FIG. 4.

Figure 4:
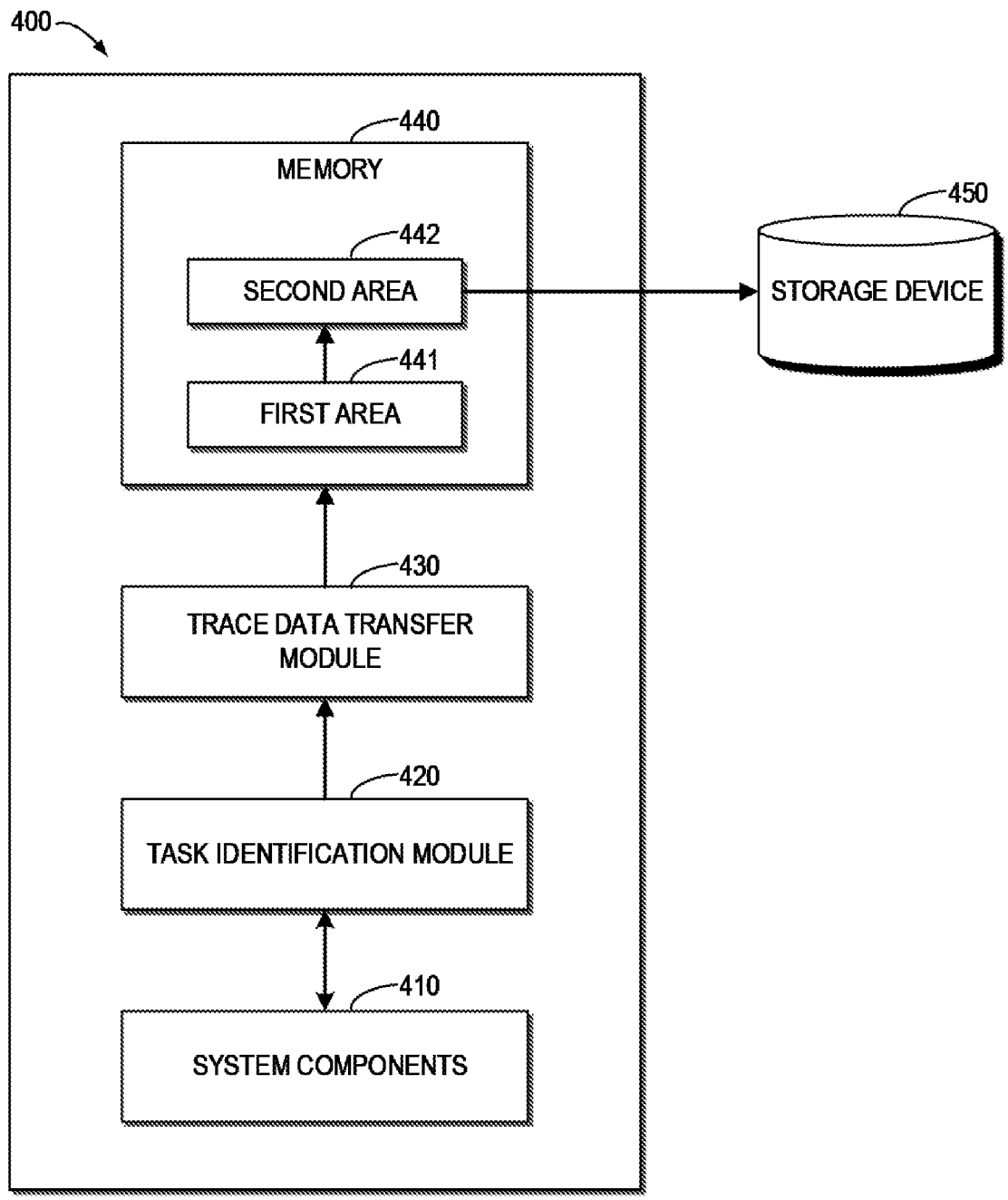
FIG. 4 is a block diagram of a system, according to some embodiments of the present disclosure.

FIG. 4 is a block diagram of a system 400, according to some embodiments of the present disclosure. It is to be understood that the structure and functionality of the system 400 are described only for the purpose of illustration without suggesting any limitations as to the scope of the present disclosure. The embodiments of the present disclosure can be embodied with a different structure and/or functionality. For example, at least part or all of the system 400 may be implemented by computer system/server 12 of FIG. 1.

The system 400 may be any computing system, such as, a transaction processing system, a data storage system and so on. As shown in FIG. 4, the system 400 may include a plurality of system components 410 on which a plurality of tasks may be executed. During execution of the plurality of tasks, respective trace data recording behaviors of the plurality of tasks may be generated and stored in a memory 440, such as, in a first area 441 allocated from the memory 440 for storing trace data. Trace data in the first area 441 can be overwritten by new trace data generated by executing subsequent tasks.

As shown in FIG. 4, in order to achieve protection of critical trace data, the system 400 may also include a task identification module 420 and a trace data transfer module 430.

The task identification module 420 may define a number of abnormal patterns for identifying a target task, where trace data of the target task needs to be protected. For example, an abnormal pattern may indicate that if a lock for a resource has been obtained by a task and the task has held the lock for a time period exceeding a threshold time period, the task can be identified as a target task. Another abnormal pattern may indicate that if a resource is locked by a task and the number of tasks waiting for the resource exceeds a threshold number, the task can be identified as a target task.

In order to identify a target task, where the trace data of the target task needs to be protected, the task identification module 420 may obtain execution information of the plurality of tasks from the system components 410 and determine whether execution information of each of the plurality of tasks matches at least one of the defined abnormal patterns. If the task identification module 420 determines that the execution information of one of the plurality of tasks matches a defined abnormal pattern, the one of the plurality of tasks can be identified as a target task.

In response to identifying a target task, the task identification module 420 may provide information about the target task to the trace data transfer module 430. For example, the information may include an identifier of the target task and/or other suitable information about the target task. In response to receiving the information about the target task from the task identification module 420, the trace data transfer module 430 may transfer the trace data of the target task from the first area 441 to a second area 442 in the memory 440. If the trace data transfer module 430 determines that existing trace data in the second area 442 is to be overwritten, the trace data transfer module 430 can offload the existing trace data in the second area 442 to a storage device 450. The storage device 450 may be an electronic storage device, a magnetic storage device, an optical storage device, an electromagnetic storage device, a semiconductor storage device, or any suitable combination of the foregoing.

In order to transfer the trace data of the target task from the first area 441 to the second area 442, the trace data transfer module 430 may extract the trace data of the target task from the first area 441. For example, the trace data of the plurality of tasks may be indexed with identifiers of tasks and stored in the first area 441 in an order of generation time or in any other order. According to the identifier of the target task, the trace data transfer module 430 may extract the trace data of the target task from the first area 441. Then, the trace data transfer module 430 may store the extracted trace data into the second area 442. If available space in the second area 442 is insufficient for storing the trace data of the target task (e.g. at least part of the existing trace data in the second area may be overwritten), the trace data transfer module 430 may offload at least part of the existing trace data in the second area 442 to the storage device 450 and then store the extracted trace data of the target task into the second area 442.

As such, critical trace data will be protected in the second area 442 or in the storage device 450 without a risk of being overwritten. When a problem of the system 400 occurs, the critical trace data can be obtained from the second area 442 and/or the storage device 450 and can be used to analyze the root cause of the problem.

Figure 5:
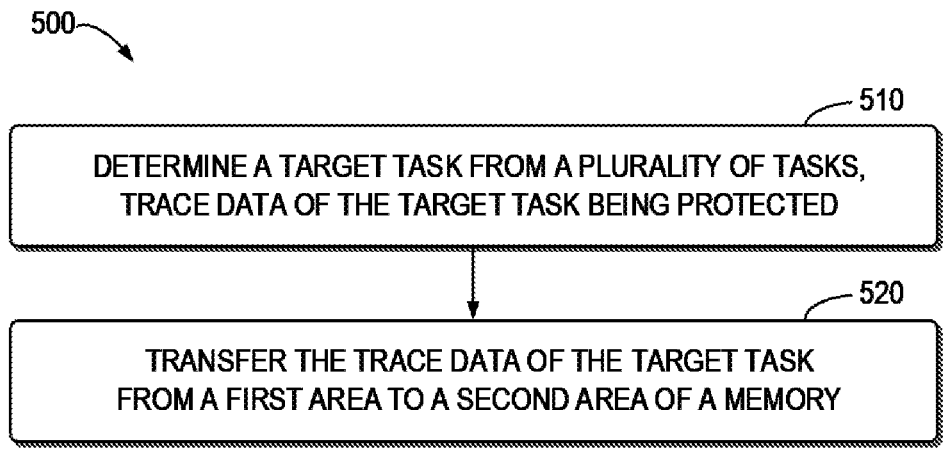
FIG. 5 is a flowchart of an example method for trace data protection, according to some embodiments of the present disclosure.

FIG. 5 is a flowchart of an example method 500 for trace data protection, according to some embodiments of the present disclosure. The method 500 may be implemented at the system 400 as shown in FIG. 4. For example, at least part or all of the system 400 may be implemented by computer system/server 12 of FIG. 1. It is to be understood that the method 500 may also comprise additional blocks (not shown) and/or may omit the illustrated blocks. The scope of the present disclosure described herein is not limited in this aspect.

At block 510, the system 400, for example, by means of the task identification module 420, determines a target task from a plurality of tasks, where trace data of the target task is to be protected.

In some embodiments, in order to determine the target task from the plurality of tasks, the system 400, for example, by means of the task identification module 420, may obtain respective execution information of the plurality of tasks and determine whether execution information of each of the plurality of tasks matches at least one abnormal pattern. For example, the at least one abnormal pattern may indicate that if a lock for a resource has been obtained by a task and the task has held the lock for a time period exceeding a threshold time period, the task can be identified as a target task. Alternatively, the at least one abnormal pattern may indicate that if a resource is locked by a task and the number of tasks waiting for the resource exceeds a threshold number, the task can be identified as a target task. In accordance with a determination that the execution information of one of the plurality of tasks matches the at least one abnormal pattern, the system 400, for example, by means of the task identification module 420, may determine the one of the plurality of tasks as the target task.

At block 520, the system 400, for example, by means of the trace data transfer module 430, transfers the trace data of the target task from a first area 441 to a second area 442 of a memory 440. In some embodiments, respective trace data of the plurality of tasks may be stored in the first area 441 and trace data in the first area 441 may be overwritten by new trace data generated by executing subsequent tasks. In some embodiments, existing trace data in the second area 442 may be offloaded to a storage device 450 before being overwritten.

In some embodiments, prior to transferring the trace data of the target task from the first area 441 to the second area 442, the system 400, for example, by means of the trace data transfer module 430, may offload at least part of the existing trace data in the second area 442 to the storage device 450 for obtaining sufficient space to store the trace data of the target task. Then, the trace data of the target task can be transferred from the first area 441 to the second area 442.

Alternatively, in some embodiments, prior to transferring the trace data of the target task from the first area 441 to the second area 442, the system 400, for example, by means of the trace data transfer module 430, may check if the second area 442 has sufficient space to store the trace data of the target task. If the second area 442 has insufficient space to store the trace data of the target task, the system 400, for example, by means of the trace data transfer module 430, may offload at least part of the existing trace data in the second area 442 to the storage device 450 for obtaining sufficient space to store the trace data of the target task and then transfer the trace data of the target task from the first area 441 to the second area 442. If the second area 442 has sufficient space to store the trace data of the target task, the system 400, for example, by means of the trace data transfer module 430, may transfer the trace data of the target task from the first area 441 to the second area 442.

Alternatively, in some embodiments, regardless of whether the second area 442 has sufficient space to store the trace data of the target task, if the system 400 determines that at least part of the existing trace data in the second area 442 is to be overwritten by the trace data of the target task, the system 400, for example, by means of the trace data transfer module 430, may offload the at least part of the existing trace data in the second area 442 to the storage device 450. Then, the system 400, for example, by means of the trace data transfer module 430, may transfer the trace data of the target task from the first area 441 to the second area 442, for example, transfer the trace data of the target task to previous storage location of the at least part of the existing trace data in the second area 442.

Figure 6:
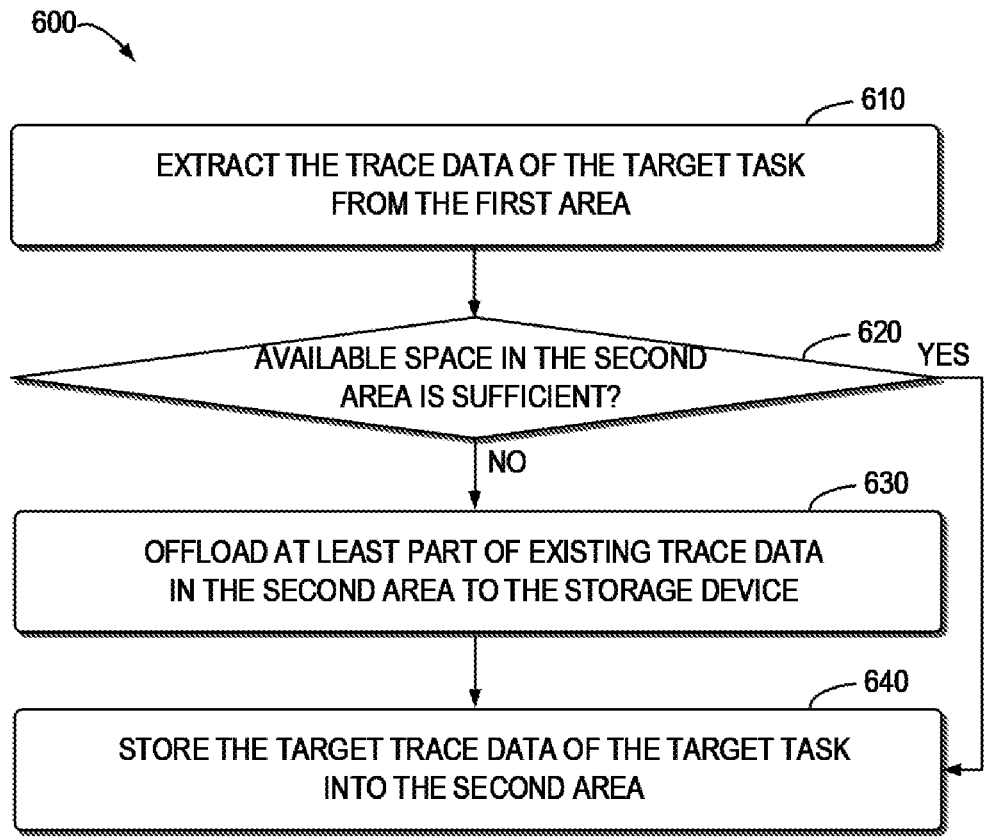
FIG. 6 is a flowchart of an example method for transferring trace data of a target task, according to some embodiments of the present disclosure.

FIG. 6 is a flowchart of an example method 600 for transferring trace data of a target task, according to some embodiments of the present disclosure. For example, the method 600 can be considered as an example implementation of the block 520. It is to be understood that the method 600 may also comprise additional blocks (not shown) and/or may omit the illustrated blocks. The scope of the present disclosure described herein is not limited by the example method.

At block 610, the system 400, for example, by means of the trace data transfer module 430, extracts the trace data of the target task from the first area 441. For example, the trace data of the plurality of tasks may be indexed with their identifiers and stored in the first area 441 in an order of generation time or in any other order. According to the identifier of the target task, the system 400, for example, by means of the trace data transfer module 430, may extract the trace data of the target task from the first area 441.

At block 620, the system 400, for example, by means of the trace data transfer module 430, determines if available space in the second area 442 is sufficient to store the trace data of the target task. If it is determined that the available space in the second area 442 is insufficient to store the trace data of the target task, the system 400, for example, by means of the trace data transfer module 430, offloads at least part of the existing trace data in the second area 442 to the storage device 450 at block 630. Then, at block 640, the system 400, for example, by means of the trace data transfer module 430, stores the trace data of the target task into the second area 442. If it is determined that the available space in the second area is sufficient to store the trace data of the target task, the method 600 proceeds to block 640, where the system 400, for example, by means of the trace data transfer module 430, directly stores the trace data of the target task into the second area 442.

Alternatively, in some embodiments, in response to the trace data of the target task being transferred from the first area 441 to the second area 442, the system 400, for example, by means of the trace data transfer module 430, may offload at least part of the existing trace data in the second area 442 to the storage device 450 for obtaining sufficient space to store subsequent critical trace data.

It can be seen that embodiments of the present disclosure provide a solution for trace data protection. This solution allows critical trace data in the memory to be protected properly and prevents the critical trace data from being overwritten by new trace data generated subsequently. Moreover, the protected trace data can be offloaded to an external storage device with minimal performance overhead.

It should be noted that the processing of trace data protection according to embodiments of this disclosure could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    writing trace data for a plurality of tasks to a first area of memory;
    determining, by one or more processors, a target task from the plurality of tasks by determining that execution information of the target task matches at least one abnormal pattern, wherein:
        trace data of the target task is to be protected; and
        the execution information of the target task comprises a lock of a resource obtained by the one of the plurality of tasks;
    determining that available space of a second area of memory is insufficient for storing existing trace data; and
    in response to determining that the available space of the second area of memory is insufficient:
        offloading a portion of the existing trace data in the second area of memory to a storage device before an overwriting; and
        transferring, by the one or more processors, the trace data of the target task from the first area of memory to the second area of memory by performing the overwriting by writing the trace data of the target task over the portion of the existing trace data in the second area of memory.

2. The method of claim 1, wherein a respective plurality of trace data of the plurality of tasks is stored in the first area, and wherein the plurality of trace data in the first area is to be overwritten by new trace data generated by executing subsequent tasks.

3. The method of claim 1, wherein transferring the trace data of the target task from the first area to the second area comprises:
    extracting, by the one or more processors, the trace data of the target task from the first area; and
    storing, by the one or more processors, the trace data of the target task into the second area.

4. The method of claim 3, wherein storing the trace data of the target task into the second area comprises:
in accordance with a determination that the available space in the second area is sufficient to store the trace data of the target task, storing, by the one or more processors, the trace data of the target task into the available space.

5. The method of claim 3, wherein storing the trace data of the target task into the second area comprises:
in accordance with a determination that the available space in the second area is insufficient to store the trace data of the target task, offloading, by the one or more processors, at least part of the existing trace data in the second area to the storage device; and
storing, by the one or more processors, the trace data of the target task into the second area.

6. The method of claim 1, further comprising:
offloading, by the one or more processors, at least part of the existing trace data in the second area to the storage device.

7. A system comprising:
a processing unit; and
a memory coupled to the processing unit and storing instructions thereon, the instructions, when executed by the processing unit, performing actions comprising:
writing trace data for a plurality of tasks to a first area of memory;
determining, by one or more processors, a target task from the plurality of tasks by determining that execution information of the target task matches at least one abnormal pattern, wherein:
trace data of the target task is to be protected; and
the execution information of the target task comprises a lock of a resource obtained by the one of the plurality of tasks;
determining that available space of a second area of memory is insufficient for storing existing trace data; and
in response to determining that the available space of the second area of memory is insufficient:
offloading a portion of the existing trace data in the second area of memory to a storage device before an overwriting; and
transferring, by the one or more processors, the trace data of the target task from the first area of memory to the second area of memory by performing the overwriting by writing the trace data of the target task over the portion of the existing trace data in the second area of memory.

8. The system of claim 7, wherein a plurality of respective trace data of the plurality of tasks is stored in the first area, and wherein the plurality of trace data in the first area is to be overwritten by new trace data generated by executing subsequent tasks.

9. The system of claim 7, wherein transferring the trace data of the target task from the first area to the second area comprises:
extracting the trace data of the target task from the first area; and
storing the trace data of the target task into the second area.

10. The system of claim 9, wherein storing the trace data of the target task into the second area comprises:
in accordance with a determination that the available space in the second area is sufficient to store the trace data of the target task, storing the trace data of the target task into the available space.

11. The system of claim 9, wherein storing the trace data of the target task into the second area comprises:
in accordance with a determination that the available space in the second area is insufficient to store the trace data of the target task, offloading at least part of the existing trace data in the second area to the storage device; and
storing the trace data of the target task into the second area.

12. The system of claim 7, wherein the actions further comprise:
offloading at least part of the existing trace data in the second area to the storage device.

13. A computer program product being tangibly stored on a non-transient machine-readable medium and comprising machine-executable instructions, the instructions, when executed on a device, causing the device to perform actions comprising:
writing trace data for a plurality of tasks to a first area of memory;
determining, by one or more processors, a target task from the plurality of tasks by determining that execution information of the target task matches at least one abnormal pattern, wherein:
trace data of the target task is to be protected; and
the execution information of the target task comprises a lock of a resource obtained by the one of the plurality of tasks;
determining that available space of a second area of memory is insufficient for storing existing trace data; and
in response to determining that the available space of the second area of memory is insufficient:
offloading a portion of the existing trace data in the second area of memory to a storage device before an overwriting; and
transferring, by the one or more processors, the trace data of the target task from the first area of memory to the second area of memory by performing the overwriting by writing the trace data of the target task over the portion of the existing trace data in the second area of memory.

14. The computer program product of claim 13, wherein a plurality of respective trace data of the plurality of tasks is stored in the first area, and wherein the plurality of trace data in the first area is to be overwritten by new trace data generated by executing subsequent tasks.

15. The computer program product of claim 13, wherein transferring the trace data of the target task from the first area to the second area comprises:
extracting the trace data of the target task from the first area; and
storing the trace data of the target task into the second area.

16. The computer program product of claim 15, wherein storing the trace data of the target task into the second area comprises:
in accordance with a determination that the available space in the second area is sufficient to store the trace data of the target task, storing the trace data of the target task into the available space.

17. The computer program product of claim 15, wherein storing the trace data of the target task into the second area comprises:
in accordance with a determination that the available space in the second area is insufficient to store the trace data of the target task, offloading at least part of the existing trace data in the second area to the storage device; and storing the trace data of the target task into the second area.

* * * * *